United States Patent
Thubert et al.

(10) Patent No.: US 7,552,234 B2
(45) Date of Patent: Jun. 23, 2009

(54) ARRANGEMENT FOR ESTABLISHING A BIDIRECTIONAL TUNNEL BETWEEN A MOBILE ROUTER AND A CORRESPONDENT NODE

(75) Inventors: Pascal Thubert, La Colle sur Loup (FR); Patrick Wetterwald, Cagnes sur Mer (FR); Marco Molteni, Antibes (FR); Massimo Villari, Messina (IT); Eric M. Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 1215 days.

(21) Appl. No.: 10/361,512

(22) Filed: Feb. 11, 2003

(65) Prior Publication Data
US 2004/0202183 A1    Oct. 14, 2004

(51) Int. Cl.
*G06F 15/16* (2006.01)
(52) U.S. Cl. .................. 709/238; 709/227; 709/228
(58) Field of Classification Search .............. 709/238, 709/227, 228
See application file for complete search history.

(56) References Cited
U.S. PATENT DOCUMENTS

| | | | |
|---|---|---|---|
| 6,850,532 B2 | 2/2005 | Thubert et al. | |
| 6,915,325 B1* | 7/2005 | Lee et al. | 709/202 |
| 2003/0031156 A1* | 2/2003 | Omae et al. | 370/338 |
| 2003/0091013 A1* | 5/2003 | Song et al. | 370/338 |
| 2003/0095523 A1* | 5/2003 | Korus et al. | 370/338 |
| 2003/0117965 A1* | 6/2003 | Markki et al. | 370/254 |
| 2003/0161287 A1* | 8/2003 | Venkitaraman et al. | 370/338 |
| 2004/0010615 A1* | 1/2004 | Ernst et al. | 709/238 |
| 2004/0093426 A1* | 5/2004 | Sahasrabudhe et al. | 709/238 |

OTHER PUBLICATIONS

Ernst et al., "Mobile Networks Support in Mobile IPv6 (Prefix Scope Binding Updates)", Internet Draft, draft-ernst-mobileip-v6-network-03.txt, Mar. 2002.
Thubert et al., "Taxonomy of Rout Optimization Models in the Nemo Context", Network Working Group, Internet Draft, draft-thubert-nemo-ro-taxonomy-00, Oct. 11, 2002.
Ernst, "Network Mobility Support in IPPv6", Thesis, Department of Mathematics and Computer Science, Oct. 29, 2001.

(Continued)

*Primary Examiner*—Ario Etienne
*Assistant Examiner*—Barbara N Burgess
(74) *Attorney, Agent, or Firm*—Leon R. Turkevich

(57) ABSTRACT

A mobile router and a correspondent router, each configured for routing services for nodes within their routing prefixes associated with their respective routing tables, establish a secure, bidirectional tunnel based on a messaging protocol between each other and a route server resource having a prescribed security relationship with the mobile router and correspondent router. The mobile router sends a query via its home agent to the route server resource to identify the correspondent router serving the correspondent node. The mobile router sends a binding update request, specifying a home address and care-of address for the mobile router, to the correspondent router for establishment of a bidirectional tunnel. The correspondent router, upon validating the home address is reachable via the care-of address, establishes the bidirectional tunnel, and updates its routing tables to specify that prescribed address prefixes are reachable via the mobile router home address.

45 Claims, 6 Drawing Sheets

OTHER PUBLICATIONS

Ng et al., "Securing Nested Tunnels Optimization with Access Router Option", Network Working Group, Internet Draft, draft-ng-nemo-access-router-option-00.txt, Oct. 2002.

Thubert, "[monet] updated charter—>MBG feature in extended mode", Jun. 3, 2002.

Ohnishi et al, "Mobile IP Border Gateway (MBG)", Mobile IP Working Group, Internet Draft, draft-ohnishi-mobileip-mbg-00.txt, Jul. 2001.

Thubert et al., "Taxonomy of Route Optimization models in the Nemo Context", Network Working Group, Internet Draft, draft-thubert-nemo-ro-taxonomy-00, Oct. 11, 2002.

Garcia-Luna-Aceves, "Source Tree Adaptive Routing (STAR) Protocol", IETF MANET Working Group, Internet Draft, draft-ietf-manet-star-00.txt, Oct. 22, 1999.

Baker, "An outsider's view of MANET", Network Working Group, draft-baker-manet-review-01, Mar. 17, 2002.

Johnson et al., "Mobility Support in IPv6", IETF Mobile IP Working Group, Internet Draft, draft-ietf-mobileip-ipv6-20.txt, Jan. 29, 2003.

Katz, "IP Router Alert Option", Network Working Group, Request for Comments: 2113, Feb. 1997.

* cited by examiner

ARRANGEMENT FOR ESTABLISHING A BIDIRECTIONAL TUNNEL BETWEEN A MOBILE ROUTER AND A CORRESPONDENT NODE

BACKGROUND OF THE INVENTION

1. Field of the Invention

The present invention relates to route optimization between mobile routers of a mobile network, for example an Internet Protocol (IP) based mobile ad hoc network (MANET) or a mobile IP network (MONET), and a correspondent node.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has two working groups focusing on mobile networks, a Mobile Ad-hoc Networks (MANET) Working Group that is working to develop standardized MANET routing specification(s) for adoption by the IETF, and NEMO (mobile networks). NEMO uses Mobile IP (MIP) to provide connectivity between mobile networks and the infrastructure (e.g., the Internet). The key component in NEMO is a mobile router that handles MIP on behalf of the mobile networks that it serves.

According to the MANET Working Group, the "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

A "Mobile IPv6" protocol is disclosed in an Internet Draft by Johnson et al., entitled "Mobility Support in IPv6", available on the World Wide Web at the address: http://www.ietf.org/internet-drafts/draft-ietf-mobileip-ipv6-20.txt (the disclosure of which is incorporated in its entirety herein by reference). According to Johnson et al., the Mobile IPv6 protocol enables a mobile node to move from one link to another without changing the mobile node's IP address. Hence, a mobile node is always addressable by its "home address", an IP address assigned to the mobile node within its home subnet prefix on its home link. Packets may be routed to the mobile node using this address regardless of the mobile node's current point of attachment to the Internet. The mobile node may also continue to communicate with other nodes (stationary or mobile) after moving to a new link. The movement of a mobile node away from its home link is thus transparent to transport and higher-layer protocols and applications.

In addition, Johnson et al. assumes that use of Mobile IPv6 eliminates the need to deploy special routers as "foreign agents" as are used in Mobile IPv4. In Mobile IPv6, mobile nodes make use of IPv6 features, to operate in any location without any special support required from the local router.

Existing Internet Drafts for NEMO do not optimize the path to an arbitrary correspondent node (CN), let alone providing a secure, optimized path. One proposal for route optimization is provided by the Internet Draft by Ohnishi et al., entitled "Mobile IP Border Gateway (MBG)", available on the World Wide Web at the address: http://www.ietf.org/internet-drafts/draft-ohnishi-mobileip-mbg-00.txt as well as the World Wide Web address http://www.mobile-ip.de/ftp/pub/ictf/drafts/draft-ohnishi-mobilelp-mbg-00.txt (the disclosure of which is incorporated in its entirety herein by reference). As recognized by Ohnishi et al., the current Mobile IP specification forces all packets forwarded to a mobile node (MN) from a correspondent node (CN) to be routed via that mobile node's home agent: this routing via the home agent often leads to triangular routing, which in turn causes data transmission delay and wastes network resources.

However, the MBG proposed by Ohnisbi et al. is limited to optimizing routes within the internal network of an Internet Service Provider (ISP). Hence, relatively inefficient triangular routing may still become prevalent between a mobile node and the correspondent node in cases where the MN or the CN are outside a prescribed ISP.

SUMMARY OF THE INVENTION

There is a need for an arrangement that enables a mobile router in a mobile network and an arbitrary router serving a correspondent node, referred to herein as a "correspondent router", to establish an optimized routing path that optimizes network resources, regardless of the network topology between the mobile router and the correspondent router.

There also is a need for an arrangement that enables a mobile router to optimize a path to an arbitrary correspondent node, served by a correspondent router, in a secure manner.

There also is a need for an arrangement that enables a mobile router to establish a secure, bidirectional tunnel with a correspondent router, providing optimized routing paths between address prefixes served by the mobile router and the correspondent router, respectively.

These and other needs are attained by the present invention, where a mobile router and a correspondent router, each configured for routing services for nodes within their routing prefixes associated with their respective routing tables, establish a secure, bidirectional tunnel based on a messaging protocol between each other and a route server resource having a prescribed security relationship with the mobile router and another distinct security relationship with the correspondent router. The mobile router, in response to determining a need for an optimized path for a correspondent node, sends a query via its home agent to the route server resource to identify the correspondent router serving the correspondent node. In response to learning the correspondent router and an address prefix for the correspondent node, the mobile router sends a binding update request, specifying a home address and care-of address for the mobile router, to the correspondent router for establishing a bidirectional tunnel. The correspondent router, upon validating the home address is reachable via the care-of address, establishes the bidirectional tunnel, and updates its routing tables to specify that prescribed address prefixes are reachable via the mobile router home address. Hence, bidirectional tunnels can be established between mobile routers and arbitrary correspondent routers, in a scalable and secure manner.

One aspect of the present invention provides a method in an Internet Protocol (IP) based router configured for sending packets output from a correspondent node for delivery to a mobile router. The method includes receiving a binding update request from the mobile router, the binding update request specifying a home address for the mobile router, a care-of address for the mobile router, and a mobile router flag specifying that the binding update was generated by a mobile router. The method also includes selectively establishing a bidirectional tunnel to the mobile router by entering the binding update request in a binding cache entry, indicating the home address is reached by the care-of address, based on verifying that the home address is reachable via the care-of address. A routing table is updated to specify that at least one identified address prefix served by the mobile router is reachable via the home address.

Another aspect of the present invention provides a method in a mobile router configured for sending packets output from a local node to a correspondent node. The method includes sending a query, via a tunnel terminated by a home agent, to a route server resource having a prescribed security association with the home agent, the query requesting identification of a correspondent router for the correspondent node. The method also includes receiving a reply, via the tunnel terminated by the home agent, that specifies the correspondent router and at least an address prefix for the correspondent node. A binding update request is sent to the correspondent router via a unidirectional tunnel to the correspondent router, the binding update request specifying a corresponding home address for the mobile router, a corresponding care-of address for the mobile router, and a mobile router flag specifying that the binding update request was generated by a router that is mobile. The method also includes validating for the correspondent router that the home address is reachable via the care-of address, and establishing a bidirectional tunnel with the correspondent router based on receiving an acknowledgment to the binding update request from the correspondent router.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
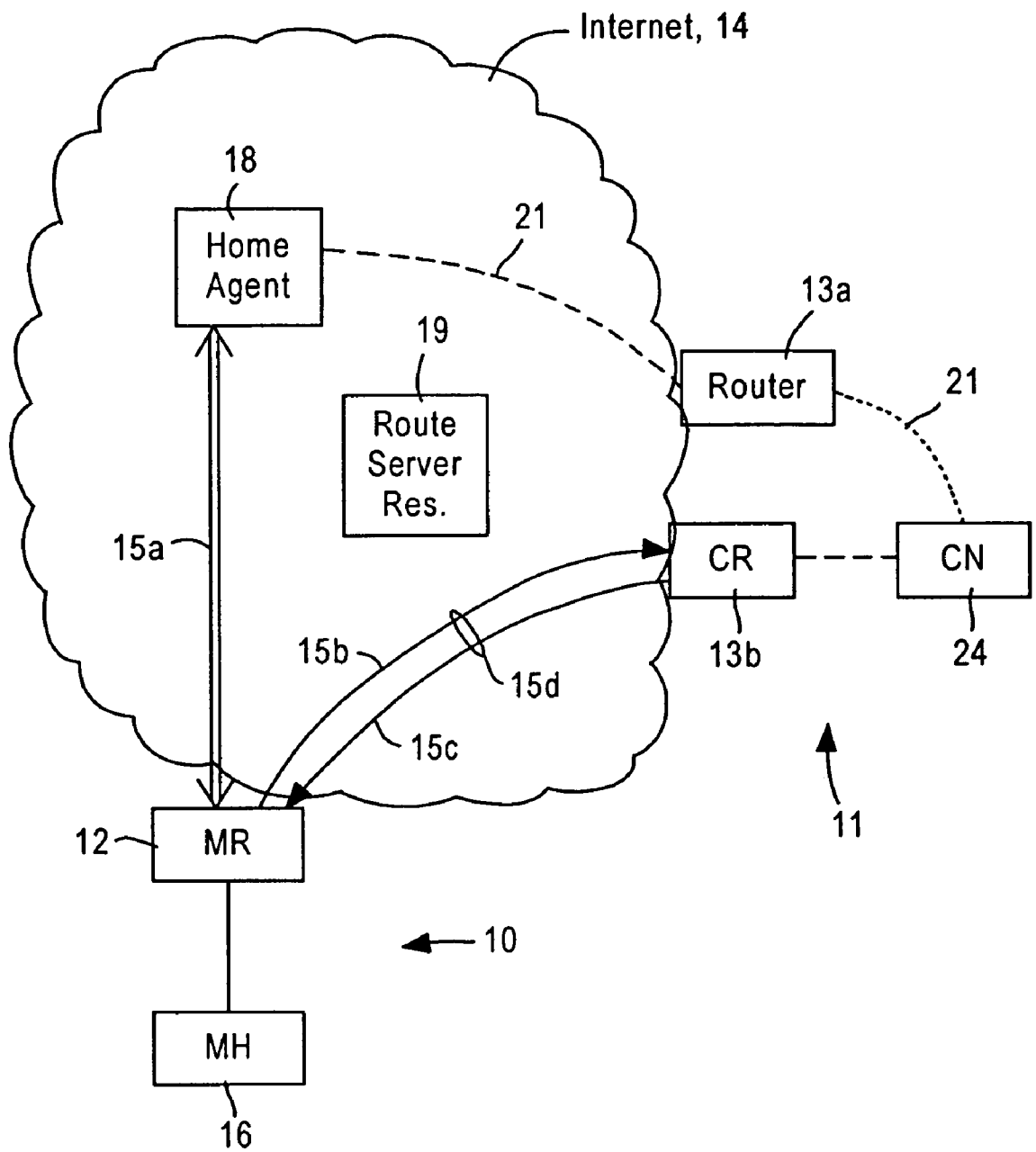
FIG. 1 is a diagram illustrating a network, including a mobile network in communication with a second network via a wide area network, such as the Internet, based on establishing a bidirectional tunnel between the two networks, according to an embodiment of the present invention.

FIG. 1 is a diagram illustrating a mobile network 10, for example a mobile ad hoc network (MANET), having a mobile router (MR) 12 and a mobile host (MH) 16 configured for communications via a wide area network 14 such as the Internet, according to an embodiment of the present invention. The mobile router 12 is configured for providing connectivity for the mobile host 16 with the wide area network 14, for example the Internet, using mobile IPv6 protocol. In particular, the mobile router 12 is configured for routing data packets from the mobile host 16 to a correspondent node 24.

Conventional approaches for routing packets between the mobile host 16 and the correspondent node 24 involve the mobile router 12 sending the packets via a home agent 18 through a bidirectional tunnel 15a. The home agent 18, upon receiving the packets via the tunnel 15a, route the packet to a router 13 (e.g., 13a) identified by existing routing protocols to provide reachability for the correspondent node 24.

The disclosed embodiment expands on the above-incorporated Ohnishi et al. and the Internet Draft by Thubert et al. (inventors of the subject application), entitled "Taxonomy of Route Optimization models in the Nemo context" available on the World Wide Web at the address: http://www.ietf.org/internet-drafts/draft-thubert-nemo-ro-taxonomy-00.txt and the disclosure of which is incorporated in its entirety by reference.

In particular, the disclosed embodiment enables the mobile router 12 and the correspondent router 13b to independently establish a bidirectional tunnel 15d for optimized routing of packets between address prefixes served by the respective mobile router 12 and the correspondent router 13b. The mobile router 12 and the correspondent router 13b each utilize a route server resource 19 for identification of relevant addressing information and establishing optimized routes via the bidirectional tunnel 15d.

The correspondent router 13b is configured for route optimization on behalf of nodes such as the correspondent node 24 within its associated subnetwork 11 (i.e., sharing the same topological group of address prefixes). The route server resource 19 is configured for providing address and routing information to the correspondent router 13b and the mobile router 12, based on distinct security associations (i.e., trusted relationships) with each of the routers: the route server resource 19 has a prescribed security association with the mobile router 12, and the route server resource has another prescribed security association with the correspondent router 13b that is distinct from the security association with the mobile router 12. The route server resource may obtain its information from, for example, configuration by a local administrator, exchanges with other route server resources (e.g., according to BGP protocol), registration with the corresponding router, or an external trusted source such as a directory service.

Hence, the mobile router 12, having a trusted relationship with the route server resource 19, registers with the route server resource 19 via the home agent 18 for identification of address prefixes served by the mobile router 12. The correspondent router 13b, which also has a trusted relationship with the route server resource 19, also registers with the route server resource by supplying its IP address, and all address prefixes served by the correspondent router 13b. Hence, the route server resource is able to associate an address prefix to a registered router, enabling the registered routers to query the route server resource 19 for identification of routers that can provide optimized paths to the respective subnet prefixes.

Hence, the mobile router 12 and the correspondent router 13b can obtain routing information from the route server resource 19 based on the respective security associations, even if the mobile router 12 and the correspondent router 13b do not have any initial security association between each other. Also note that the route server resource 19 may be implemented across multiple distributed servers, or a network of route server resources, that implement a prescribed protocol for sharing routing information in a secure manner.

Moreover, the accessing of routing information from the route server resource 19 also enables the mobile router 12 to discover the correspondent router 13b even if the correspondent router 13b is not readily detectable by existing routing protocols. In particular, existing routing protocols may specify the router 13a as serving the correspondent node 24, and where the correspondent node 24 initially identifies the router 13a as its default router. As described below, route optimization includes identifying to the mobile router 12 that the correspondent router 13b is able to serve the correspondent node 24, and, establishing the bidirectional tunnel 15d based on specific verification procedures, and advertising by the correspondent router 13b to nodes within its associated address prefixes that address prefixes served by the mobile router 12 are reachable via the correspondent router 13b.

The correspondent router 13b may be implemented as a fixed router, in which case it may be collocated with its route server resource 19, and represent a large number of address prefixes from its autonomous system. Note that the represented prefixes are not necessarily attached to the correspondent router 13b, and as described above the correspondent router 13b may not be on the default path 21 between the represented prefixes and the Internet infrastructure. The correspondent router 13b also may be implemented as a mobile router 12, in which case it may perform mobile IP route optimization with the peer mobile router (which in turn plays a correspondent router role).

The disclosed embodiment introduces a routing information protocol between the mobile router 12 and the route server resource 19. Since a security association generally exists between a mobile router 12 and its home agent 18, the home agent 18 is expected to be its route server resource, or to act as a trusted proxy of the route server resource. As described below with respect to FIGS. 4A and 4B, the protocol is based on query messages sent to the route server resource 19, and reply messages from the route server resource 19. In addition, the correspondent router 13b may register for updates of the queried information for a period of time, and the mobile router 12 may registered its prefixes to be associated with its home address and advertise to other route server resources.

Figure 2:
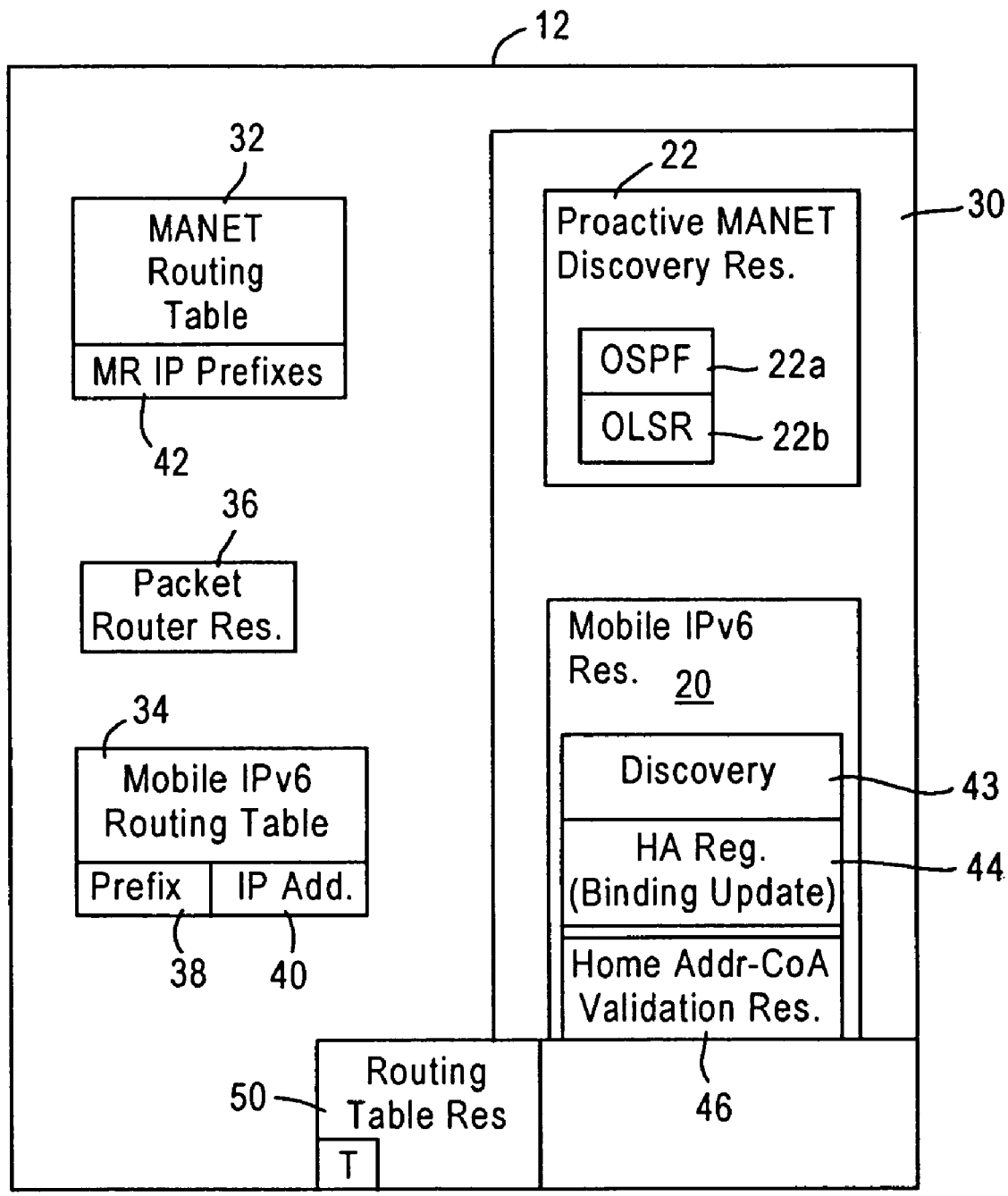
FIG. 2 is a diagram illustrating in detail the mobile router of FIG. 1.

FIG. 2 is a diagram illustrating in detail the mobile router 12, according to an embodiment of the present invention. The mobile router 12 includes an Internet protocol (IP) interface 30, including mobile IPv6 protocol resources 20 configured for execution of mobile IPv6 protocol communications with an access router (not shown) of the wide area network 14. The IP interface 30 also may optionally include MANET protocol resources 22 configured for execution of MANET protocol communications within the local network 10; in this case, the mobile router also may optionally include a MANET routing table 32. The mobile router 12 also includes a mobile IPv6 routing table 34, a packet router resource 36, and a routing table resource 50 having an expiration timer (T).

Assuming the mobile router 12 is configured to support MANET networks, exemplary proactive MANET protocol resources 22 that may be utilized for identifying the mobile hosts 16 include an OSPF (ver. 3) resource 22a, configured for monitoring link connectivity information advertised by each mobile host 16 in the MANET 10 and maintaining a MANET routing table 32; another routing protocol that may be used is Source Tree Adaptive Routing (STAR) protocol, described in an Internet Draft by J. J. Garcia-Luna-Aceves et al., available from the IETF on the World Wide Web at http://www.ietforg/proccedings/99nov/I-D/draft-letf-manet-star-00.txt. The MANET routing table 32 is configured for storing IP address prefixes 42 of the mobile routers and associated connectivity and routing information (e.g., link state status, etc.). The MANET protocol resources 22 also may includes an Optimized Link State Routing (OLSR) Protocol resource 22b, configured for identifying the mobile routers 16 using hello messages and link state flooding to populate the MANET routing table 32. Additional information regarding the MANET protocol resources 22 is described in an Internet Draft by Baker, entitled "An Outsider's View of MANET", available from the IETF on the World Wide Web at the address http://www.ietf.org/internet-drafts/draft-baker-manet-review-01.txt (the disclosure of which is incorporated in its entirety herein by reference).

The packet router resource 36 is configured for forwarding packets received via tunnel connections (e.g., 15a, 15d) to the destination (e.g., mobile host 16) based on the subnet information 38 stored in the routing table 34, and the IP address prefix 42 stored in the MANET table.

Figure 4A:
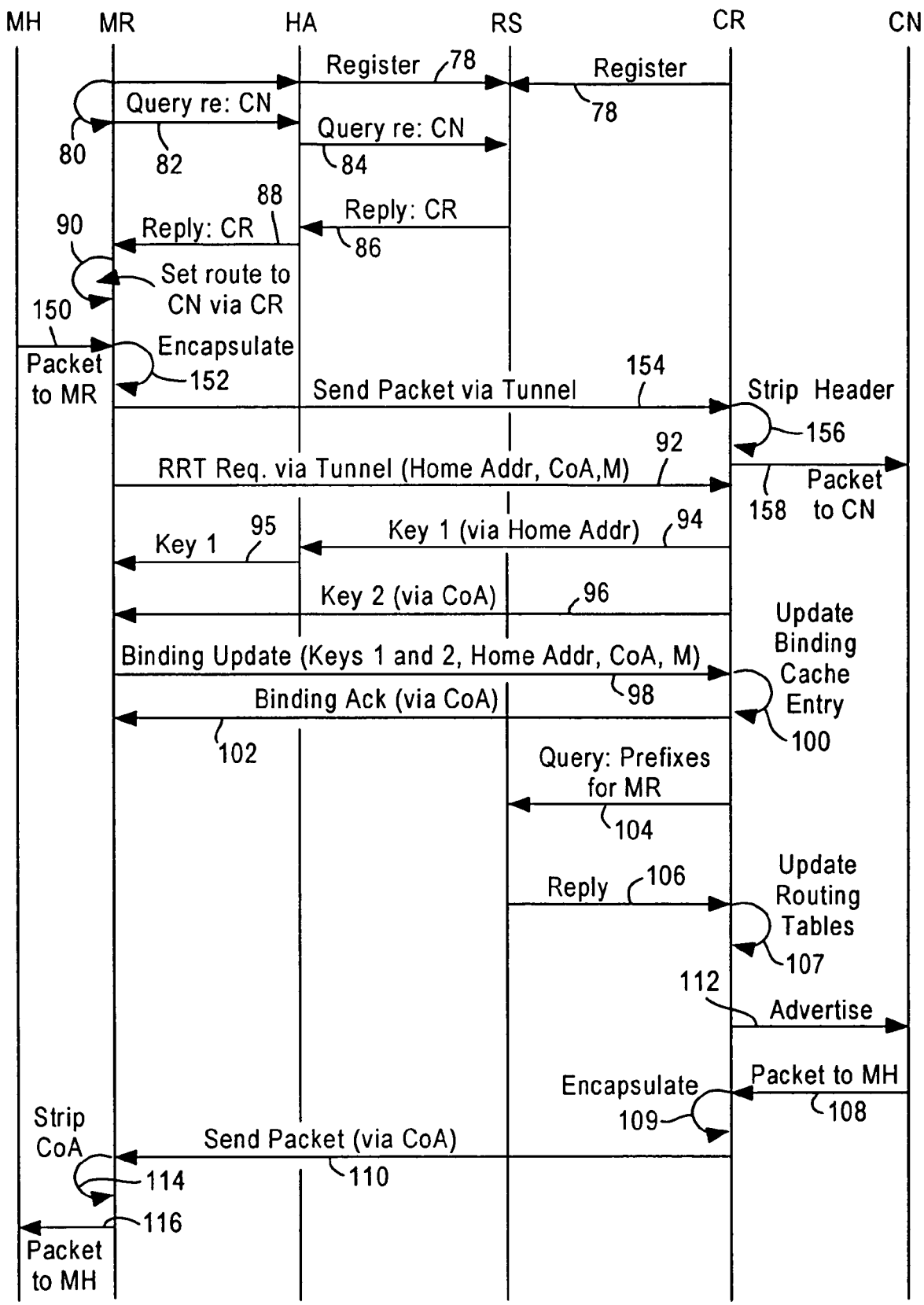
FIGS. 4A and 4B are diagrams summarizing the method by the mobile router and the correspondent router of establishing and maintaining a bidirectional tunnel, according to an embodiment of the present invention.
Figure 4B:
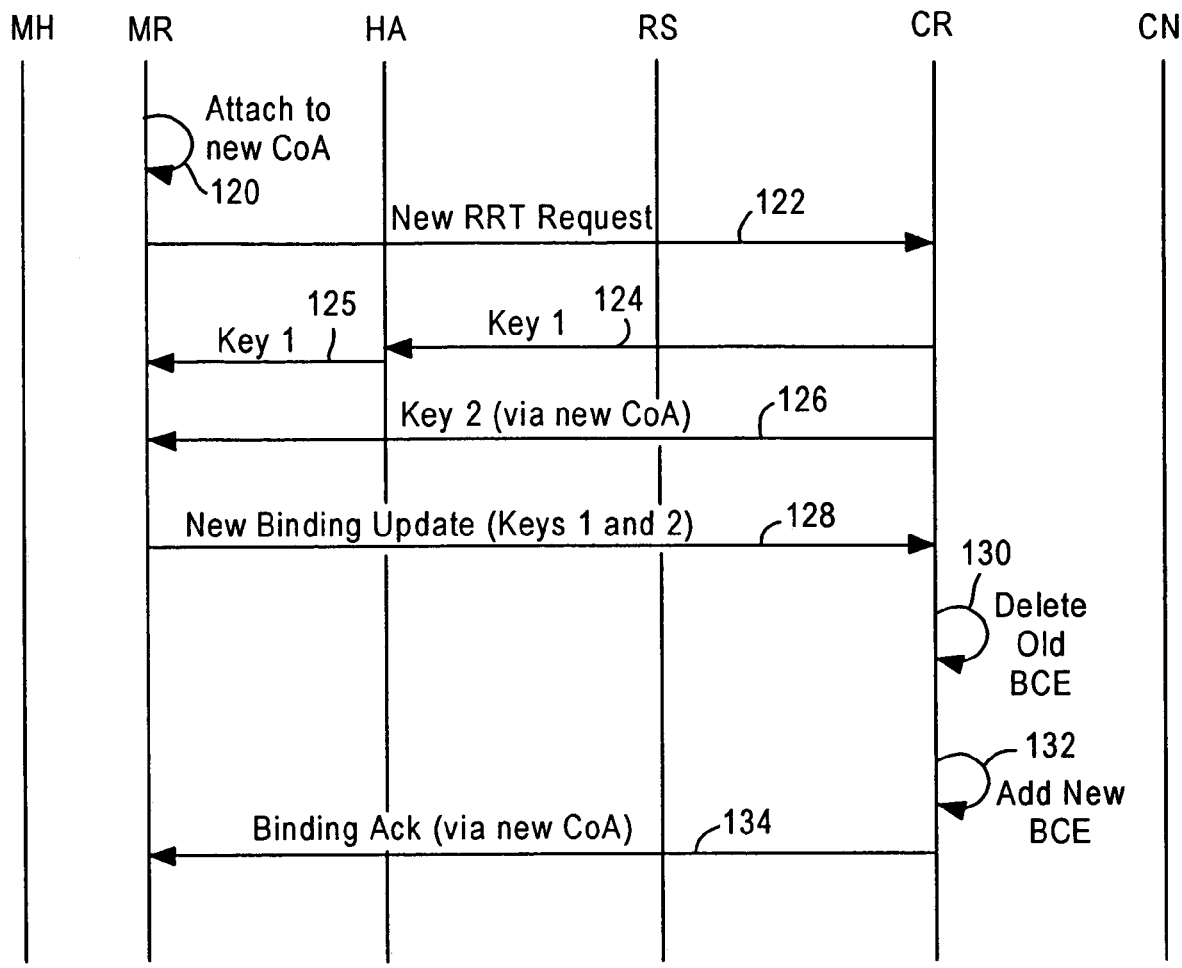

The mobile IPv6 resource 20 is configured for sending a query, via the tunnel 15a terminated by the home agent 18, to a route server resource 19. The query, described in detail below with respect to FIGS. 4A and 4B, is generated by an IPv6 discovery resource 43, configured for populating the mobile IPv6 routing table 34. The IPv6 discovery resource 43 is configured for discovering local nodes according to IPv6 protocol, and generating queries to the route server resource 19 for establishment of the unidirectional tunnel 15b, and possibly the bidirectional tunnel 15d, described below with respect to FIGS. 4A and 4B. The IPv6 discovery resource 43 also is configured for receiving binding update requests from mobile nodes 16 requesting attachment, and a binding acknowledgment from the correspondent node 13b during formation of the unidirectional tunnel 15c that results in the formation of the bidirectional tunnel 15d, described below.

The mobile IPv6 discovery resource 43 also is configured for outputting a Home Agent Address Discovery Request message to an anycast address identified for a subnet prefix. In particular, each mobile router (e.g., within the mobile network 10) has a unique IP address, where part of the IP address includes a subnet prefix that identifies a subnet to which the mobile router belongs to (i.e., the subnet for which the corresponding home agent 18 is a member); since multiple mobile routers may belong to the same subnet and have the same subnet prefix, the discovery resource 43 is configured for discovering each home agent associated with a corresponding subnet prefix.

As specified by the above-incorporated Internet Draft by Johnson et al., a home agent 18 is configured for responding to a Home Agent Address Discovery Request message by outputting a Home Agent Address Discovery Reply message, which specifies the home agent IP addresses that maybe utilized for the corresponding subnet prefix (i.e., the routers within the subnet that may serve as home agents). The discovery resource 43, in response to receiving a Home Agent Address Discovery Reply message, causes the routing table resource 50 to update the mobile IPv6 routing table 34 with the home agent IP addresses 40 that may be used for the corresponding subnet prefix 38. Additional details related to home agent registration are disclosed in commonly-assigned, copending application Ser. No. 10/247,512, filed Sep. 20, 2002, entitled Arrangement in a Gateway for Registering Mobile Routers of a Mobile Ad Hoc Network to Respective Home Agents, the disclosure of which is incorporated in its entirety herein by reference.

The mobile IPv6 resource 20 also includes a home agent registration resource (i.e., a binding update resource) 44 configured for registering the mobile router 12 (and optionally each node 16 associated with a given subnet prefix) with the corresponding home agent 18 by sending a binding update message. Additional details relating to mobile router registration are provided in the above-incorporated Internet Draft by Johnson et al.

The binding update resource 44 also is configured for sending a binding update request to the correspondent router 13b via a unidirectional tunnel 15b, in an attempt to establish the bidirectional tunnel 15d. In particular, once the discovery resource 43 has received a reply from the route server resource 19 that identifies the correspondent router 13b serving the correspondent node 24, the routing table resource 50 can update the routing table 34 to specify the LP address 40 for the correspondent router 13b and the correspondent subnet prefix 38.

Once the routing table resource 50 has updated the routing table 34 to identify that the address prefix 38 for the correspondent node 24 is reachable via the correspondent node 13b (identified by its corresponding IP address 40), the packet router resource 36 can route packets to the correspondent router 13b via the unidirectional tunnel 15b, eliminating the necessity that the packets to the correspondent router 13b be sent via the tunnel 15a terminated by the home agent 18.

The IPv6 interface resource 20 also includes a home address/care-of address validation resource 46 configured for requesting an IPv6 based Return Routability Test (RRT) to be executed by the correspondent router 13b; the validation resource 46 also is configured for responding to validation queries from the correspondent node 13b. As described below with respect to FIGS. 4A and 4B, the home address/care-of address validation resource 46, in response to receiving two secure validation keys from the correspondent router 13 via the care-of address (via the path 15c) and the home address (via the tunnel 15a) of the mobile router, forwards the two secure validation keys to the binding update resource, enabling the binding update resource 44 to output to the correspondent router 13b a binding update request that includes the validation keys. Hence, the binding update request enables the correspondent router to verify that the home agent address of the mobile router 12 is reachable via the care of address (via the tunnel 15c).

Figure 3:
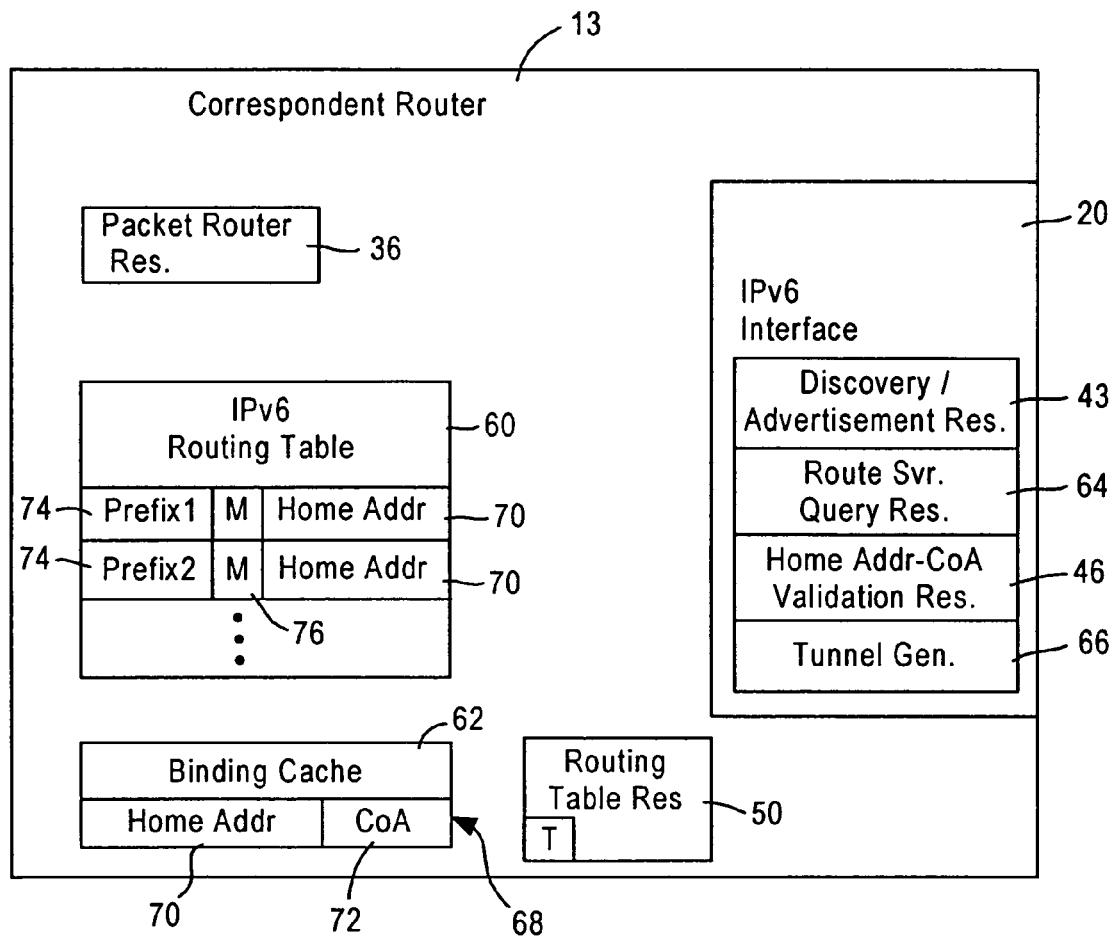
FIG. 3 is a diagram illustrating in detail the correspondent router of FIG. 1.

FIG. 3 is a diagram illustrating the correspondent router 13, according to an embodiment of the present invention. The correspondent router 13 is essentially functionally equivalent to the mobile router 12, except that the correspondent router may optionally include the mobile IP-based resources (e.g., MANET routing table 32, MANET discovery resources 22), depending on whether the correspondent router 13b is implemented as a mobile router. Typically, however, the correspondent router 13 includes at least an IPv6 interface 20, a packet router resource 36, a routing table resource 50, an IPv6 routing table 60, and a binding cache 62.

The IPv6 interface 20 includes a discovery/advertisement resource 43, a route server query resource 64, a home address-care of address validation resource 46, and a tunnel generator 66. The discovery resource 43 is configured for receiving a binding update request from the mobile router 12 via the unidirectional tunnel 15b. As described below, the binding update request specifies a home address for the mobile router, a care-of address for the mobile router, and a mobile router flag (M) specifying that the binding update was generated by a mobile router, and security keys that validate for the correspondent router 13 that the home address of the mobile router 12 is reachable via the care-of address. The tunnel generator 66 is configured for selectively establishing a bidirectional tunnel 15d to the mobile router 12 by entering the binding update request in a binding cache entry 68, indicating the home address 70 is reached by the care-of address 72, based on the validation resource 46 verifying that the home address 70 is reachable via the care-of address 72.

The validation resource 46 is configured for initiating a return routability test (RRT) in response to an RRT request from the mobile router 12, described below with respect to FIG. 4A. Once the correspondent router 13 has established the bidirectional tunnel 15d and added the binding cache entry 68 to the binding cache 62, the route server query resource 64 sends a query to the route server resource 19. The query by the route server query resource 64 requests the address prefixes served by the mobile router 12, to enable the correspondent router 13 to send all traffic for the identified prefixes to the mobile router 12 via the bidirectional tunnel 15d. Hence, the correspondent router 13 and the mobile router 12 can optimize routing paths for all subnet prefixes reachable via the respective routers 12 and 13 bypassing all relevant traffic via the bidirectional tunnel 15d.

The routing table resource 50 is configured for updating the routing table 60 to specify that the address prefixes 74 served by the mobile router 12, as identified by the route server query resource 64, is reachable via the home address 70. The mobile router flag (M) 76 specifies that the home address 70 points to a mobile node. Hence, the packet router resource 36, in response to detecting the mobile router flag 76, accesses the binding cache entry 68 for the matching home address 70 to obtain the corresponding care-of address for forwarding a packet via the tunnel 15d. As described below, the tunnel 15d can be re-established in the event that the mobile router 12 moves to a new care of address, merely by adding a new binding cache entry 68 that specifies the new care of address 72 for the corresponding home address 70.

FIGS. 4A and 4B are diagrams illustrating the method by the mobile router 12 and the correspondent router 13b of optimizing routing paths based on establishment of the bidirectional tunnel 15d, according to an embodiment of the present invention. The steps described in FIGS. 4A and 4B can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

The method of FIG. 4A begins in step 78, where the mobile router 12 and the correspondent router 13b register their address prefixes with the route server resource 19 (note the mobile router 12 registers via the bidirectional tunnel 15a terminated by the home agent (HA) 18). The method continues in step 80, where the discovery resource 43 detects a threshold amount of traffic to the correspondent node 24 (or to nodes within an identified subnet prefix). The mobile IPv6 resource 20 sends in step 82 a query, generated by the discovery resource 43, via the tunnel 15a to the home agent 18. The query requests identification of a correspondent router for the correspondent node 24 (or identified subnet prefix). The home agent 18 forwards the request to the route server resource 19 in step 84, based on having a prescribed security association between the home agent 18 and the route server resource 19. The request is sent according to mobile IP protocol, where the source address of the request specifies the home address of the mobile router 12.

The route server resource 19 outputs in step 86 a reply to the home address of the mobile router 12: the reply specifies the correspondent router 13b (in the form of the IP address of the CR 13b),and (at a minimum) the address prefix for the correspondent node 24; typically, however, the reply will specify all address prefixes reachable via the correspondent router 13b. The home agent 18 intercepts the reply sent to the home address, and forwards the reply in step 88 to the mobile router 12 via the bidirectional tunnel 15a.

The discovery resource 43 of the mobile router 12, in response to receiving the reply via the tunnel 15a, causes the routing table resource 50 to establish a unidirectional tunnel 15b in step 90 by updating the routing table 34 to specify the subnet prefix 38 of the correspondent node 24 and the IP address 40 of the correspondent router 13b. Once the tunnel 15b is established, the mobile router can begin sending packets received from the mobile host 16 in step 150 by encapsulating the received packet in step 152 with an IPv6 routing header specifying the correspondent router 13b as the destination address. The correspondent router 13b strips off the routing header in step 156, and forwards the packet in step 158 to the correspondent node 24.

Since the mobile router 12 does not have a security association with the correspondent router 13b, the mobile router 12 needs to enable the correspondent router to verify that its home address is reachable via the care-of address. The validation resource 46 of the mobile router 12 outputs in step 92 a return routability test (RRT) request to the correspondent router 13b via the unidirectional tunnel 15b. The RRT request output in step 92 specifies the home address 70 for the mobile router 12, a corresponding care of address 72 for the mobile router 12, and a mobile router flag 76 specifying that the source of the binding update request is a mobile router. In particular, the Mobile IPv6 protocol specified by the above-incorporated draft by Johnson et al. uses a Mobility Header, specified in Sec. 6.1, used to carry the following messages: Home Test Init; Home Test; Care-of Test Init; and Care-of Test. These four messages are used to initiate the RRT from the mobile router to the correspondent router. Hence, the RRT request output in step 92 is implemented, according to Mobile IPv6 protocol, by sending the Home Test Init message and the Care-of Test Init message. Further details of the RRT are available in Section 5.2.5, for example, of the above-incorporated draft by Johnson et al.

The discovery resource 43 of the correspondent router 13, in response to receiving the RRT request, causes the validation resource 46 to validate that the home address 70 is reachable by the care of address 72 specified in the binding update request. In particular, the validation resource 46 of the correspondent router 13 sends in step 94 a first packet, having a first secure key, to the home address for the mobile router 12; the packet is received by the home agent 18, which forwards the packet in step 95 via the tunnel 15a to the mobile router 12. The validation resource 46 of the correspondent router 13 sends in step 96 a second packet, having a second secure key, to the care of address for the mobile router 12 via a unidirectional tunnel 15c that bypasses the home agent 18.

The validation resource 46 of the mobile router 12, in response to receiving the packets having the respective first and second secure keys, forwards the keys to the binding update resource 44. The binding update resource 44 sends in step 98 a binding update request that includes the first and second secure keys that were sent to the home address and care of address, respectively, as well as the home address 70, the care-of address 72, and the mobile flag 76. Hence, the validation resource 46 in the correspondent router 13 verifies in step 100 that the home address 70 is reachable via the care of address 72 based on receiving the packet that includes the first secure key and the second secure key.

In response to the validation resource 46 validating that the home address is reachable via the care of address, the tunnel generator 66 establishes a bidirectional tunnel 15d in step 102 by entering the binding update request in the binding cache entry 62, and sending a binding acknowledgment to the mobile router 12 via the tunnel 15d (i.e., via the care of address). The route server query resource 64 in the correspondent router 13b sends in step 104 a request to the route server resource 19 for the address prefixes served by the mobile router 12 in response to establishment of the bidirectional tunnel 15d.

Upon receiving in step 106 a reply from the route server resource 19 that specifies the address prefixes served by the mobile router, the route server query resource 64 causes the routing table resource 50 to update in step 107 the routing table 60 to specify the address prefixes 74 served by the mobile router 12 based on its corresponding home address 70. Since the routing table 60 includes a mobile router flag 76, the packet router resource 36 can encapsulate 109 any messages received in step 108 from the correspondent node 24. The encapsulated message is sent in step 110 to the care of address 72 based on the corresponding binding cache entry 68. The mobile router strips the care of address header in step 114, and forwards the packet in step 116 to the mobile host 16.

In the event that the correspondent node 24 does not select the correspondent router 13b as its default router, the advertisement resource 43 of the correspondent router 13b may output in step 112 router advertisement messages that advertise the new routes available to the correspondent router 13 via the tunnel 15d; hence, the correspondent the 24 can learn of the available route via the correspondent router 13b, even if the correspondent router 13b is not selected by the correspondent node 24 as its default router.

As illustrated in FIG. 4B, if in step 120 the mobile router 12 attaches to a new attachment router having a new care of address, the mobile router 12 sends in step 122 a new RRT request to the correspondent router 13b that specifies the home address, the new care of address, and the mobile router flag. The correspondent router 13b repeats the validation steps by sending the first and second security keys to the home address and the care of address in steps 124 and 126, respectively. The home agent, having received a prior binding update message from the mobile router 12 (not shown), sends in step 125 the message carrying the first key to the mobile router 12 via the new care-of address. The mobile router responds to the validation test by sending in step 128 a new binding update request that includes the home address, the new care-of address, and the first and second security keys. In this case, the correspondent router 13b only needs to delete the existing binding cache entry (BCE) 68 in step 130, and enter the new binding update request in step 132. A binding acknowledgment is sent via the new care of address in step 134.

According to the disclosed embodiment, routing paths between the mobile router and an arbitrary correspondent router can be optimized, independent of a home agent tunnel, based on queries sent to a route server resource having a prescribed security association with each of the routers. Further, the routes between the two routers can be optimized without the need for network management tools or protocols.

Figure 5:
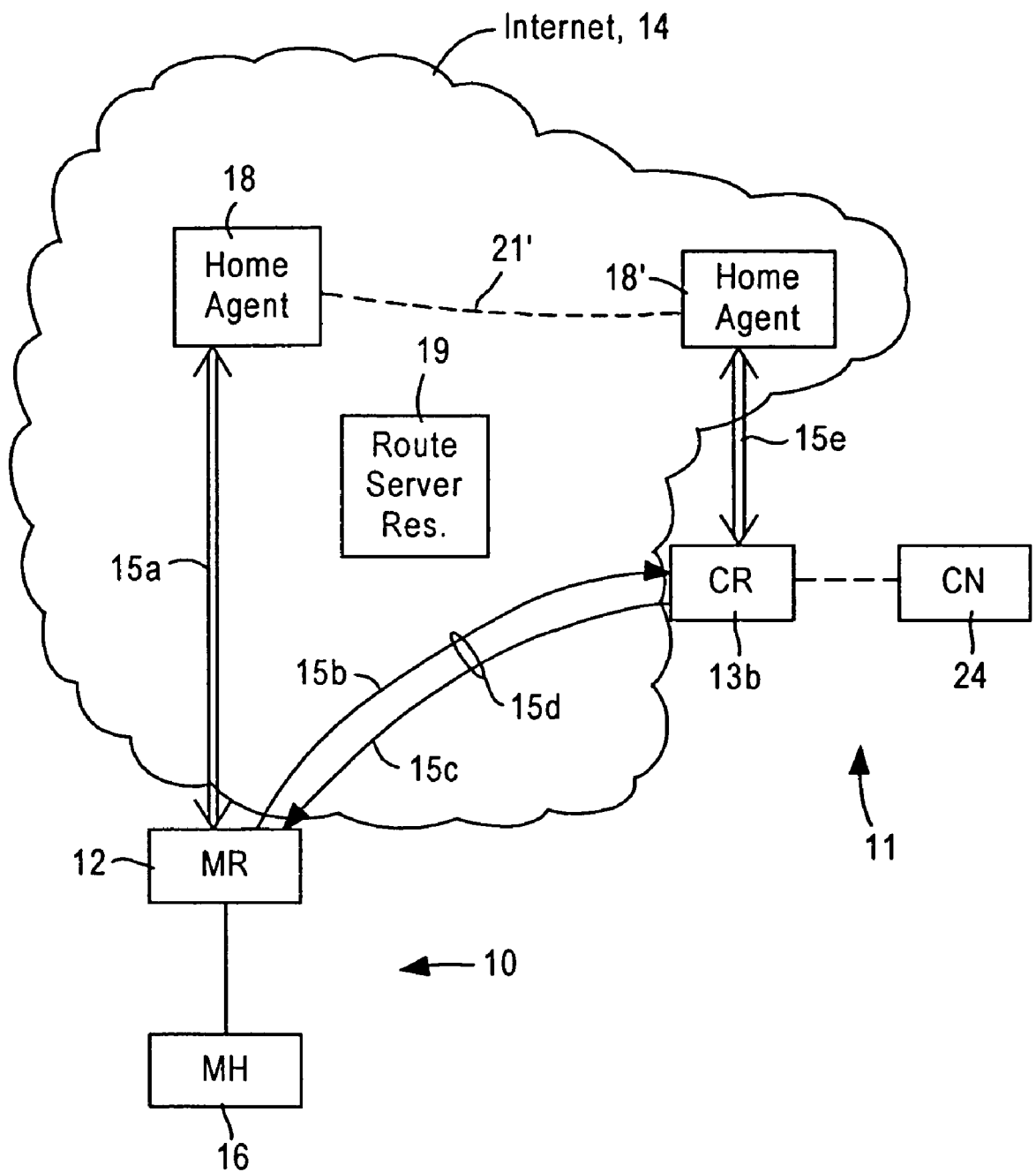
FIG. 5 is a diagram illustrating a variation of the arrangement in FIG. 1 of establishing a bidirectional tunnel, where the correspondent router is implemented as a mobile router.

FIG. 5 illustrates a variation where the correspondent router is implemented as a mobile router. As apparent from the foregoing, the correspondent (mobile) router 13b, which has its own bidirectional tunnel 15e with its own home agent 18', can create the bidirectional tunnel 15d that bypasses both home agent tunnels 15a and 15e, based on repeating the steps described above with respect to the mobile router 12.

In particular, the correspondent router 13b sends an RRT request to the mobile router 12 via the tunnel 15c (see step 92). The mobile router 12, having initially sent messages to the home address of the correspondent router 13b via the path 21' to the home agent 18', receives an RRT request from the CR 13b that specifies the home address, care-of address, and mobile router bit. The mobile router 12 performs the return routability test by sending one key via the home address (path 21'), and the second key via the care-of address (via tunnel 15b) (see steps 94 and 96, respectively). The correspondent router 13b, having received the first key from the home agent 18' via the tunnel 15e, sends a binding update request to the mobile router 12 that includes correspondent router's home address, care of address, and the two security keys (see step 98). The mobile router 12 then updates its binding cache entry, enabling the nodes 16 and 24 to communicate via the optimized path 15d, even when the two routers 12 and 13b are mobile routers.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an Internet Protocol (IP) based router, the method comprising:
    receiving by the router a binding update request generated by a mobile router, the router configured for sending packets output from a correspondent node to the mobile router via a wide area network, the binding update request addressed to the router and specifying a home address for the mobile router, a care-of address for the mobile router, and a mobile router flag specifying that the binding update was generated by a mobile router;
    selectively establishing by the router a bidirectional tunnel between the mobile router and the router, by entering the binding update request in a binding cache entry indicating the home address is reached by the care-of address, based on the router verifying that the home address is reachable via the care-of address, wherein the bidirectional tunnel is terminated by the mobile router and the router;
    updating by the router a routing table to specify that at least one identified address prefix served by the mobile router is reachable via the home address, the router distinct from a home agent configured for providing reachability to the mobile router via a mobile router-home agent tunnel that is distinct from the bidirectional tunnel;
    wherein the router executes the verifying that the home address is reachable via the care-of address based on:
    first sending a first packet, having a first secure key, to the home address for the mobile router;
    second sending a second packet, having a second secure key, to the care-of address for the mobile router; and
    verifying the home address is reachable via the care-of address based on detecting the first secure key and the second secure key within the binding update request.

2. The method of claim 1, wherein the updating step includes:
    sending a request to a route server resource for the at least one address prefix served by the mobile router in response to establishment of the bidirectional tunnel; and
    receiving a response from the route server resource that specifies the at least one identified address prefix served by the mobile router.

3. The method of claim 2, wherein the sending step includes requesting the at least one address prefix corresponding to an identified host served by the mobile router.

4. The method of claim 2, wherein the sending step includes requesting; address prefixes for all hosts served by the mobile router, the receiving step including identifying multiple identified address prefixes served by the mobile router.

5. The method of claim 4, further comprising the router selectively outputting router advertisement messages specifying the identified address prefixes are reachable via the router.

6. The method of claim 1, further comprising the router routing a packet from the correspondent node to a destination host served by the mobile router by:
    generating a routable packet by adding a routing prefix to the packet that specifies the home address;
    detecting the home address corresponds to a mobile node based on the mobile router flag;
    retrieving the corresponding care-of address for the home address from the binding cache entry; and
    outputting onto the bidirectional tunnel an encapsulated packet that includes the routable packet encapsulated by a routing header that specifies the care-of address.

7. The method of claim 1, further comprising:
    receiving by the router a second binding update request from the mobile router that specifies the home address, a second care-of address for the mobile router, and the mobile router flag;
    the router verifying that the home address is reachable by the second care-of address; and
    the router selectively establishing a new bidirectional tunnel to the mobile router by entering the second binding update request in a second binding cache entry, and deleting the binding update request entered in the binding cache entry, indicating the home address is reached by the second care-of address, based on the verifying that the home address is reachable by the second care-of address.

8. The method of claim 1, further comprising the router selectively deleting the binding cache entry based on a determined absence of packets via the bidirectional tunnel for at least a prescribed inactivity threshold.

9. The method of claim 1, further comprising the router registering with a route server resource having a prescribed security association with the router, the registering including supplying an IP address for the router and at least an address prefix that enables the route server resource to associate a route to the correspondent node via the router, the route server resource enabling the mobile router to associate the route to the correspondent node via the router.

10. The method of claim 1, wherein the IP-based router is implemented as a second mobile router having a second corresponding home address and a second corresponding care-of address and configured for communications via a tunnel terminated by a corresponding second home agent, the selectively establishing step including:
    sending a second binding update request to the mobile router specifying the second home address, the second care-of address, and the mobile router flag;
    validating for the mobile router that the second home address is reachable via the second care-of address; and
    establishing the bidirectional tunnel, bypassing the second home agent, with the mobile router based on receiving an acknowledgment to the second binding update request from the mobile router.

11. A method in a mobile router, the method comprising:
    sending by the mobile router a query, via a tunnel terminated by a home agent, to a route server resource having a prescribed security association with the home agent, the query requesting identification of a correspondent router for a correspondent node, the mobile router configured for sending packets output from a local node to the correspondent node via a wide area network;

receiving by the mobile router a reply, via the tunnel terminated by the home agent, that specifies the correspondent router and at least an address prefix for the correspondent node;

sending a binding update request generated by the mobile router and addressed to the correspondent router via a unidirectional tunnel established between the mobile router and the correspondent router, the binding update request specifying a corresponding home address for the mobile router, a corresponding care of address for the mobile router, and a mobile router flag specifying that the binding update request was generated by a router that is mobile;

validating by the mobile router and for the correspondent router that the home address is reachable via the care of address; and establishing by the mobile router a bidirectional tunnel, between the mobile router and the correspondent router and distinct from the tunnel terminated by the home agent, based on the mobile router receiving an acknowledgment to the binding update request from the correspondent router, the bidirectional tunnel terminated by the mobile router and the correspondent router;

wherein the validating includes:

receiving a first packet, having a first secure key, from the correspondent node via the tunnel terminated by the home agent;

receiving from the correspondent node a second packet, having a second secure key and a routing header specifying the care-of address; and sending a validation message to the correspondent node, via the unidirectional tunnel, that includes the first secure key and the second secure key.

12. The method of claim 11, further comprising the mobile router establishing the unidirectional tunnel based on updating a routing table to specify at least that the address prefix, for the correspondent node, is reachable via the correspondent router.

13. The method of claim 12, wherein the reply specifies a plurality of address prefixes reachable by the correspondent router, the updating including specifying within the routing table that the address prefixes are reachable by the correspondent router.

14. The method of claim 11, further comprising:

receiving by the mobile router and via the bidirectional tunnel a packet having a routing header specifying the care-of address;

removing the routing header by the mobile router to obtain a transmitted packet specifying the home address as a destination address;

the mobile router recovering from the transmitted packet a destination packet specifying a host destination address within a range of an address prefix served by the mobile router;

and outputting by the mobile router the destination packet to the local node having the host destination address.

15. The method of claim 11, further comprising:

attaching by the mobile router to a new attachment router having a corresponding new care-of address;

sending a second binding update request generated by the mobile router to the correspondent router based on the mobile router attaching to the new attachment router, the second binding update request specifying the home address, the new care-of address, and a mobile router flag specifying that the second binding update request was generated by a router that is mobile;

validating by the mobile router and for the correspondent router that the home address is reachable via the second care-of address; and establishing by the mobile router a new bidirectional tunnel with the correspondent router based on receiving an acknowledgment to the second binding update request from the correspondent router.

16. An Internet Protocol (IP) based router comprising:

an IP interface configured for receiving a binding update request generated by a mobile router, the router configured for sending packets output from a correspondent node to the mobile router via a wide area network, the binding update request addressed to the router and specifying a home address for the mobile router, a care-of address for the mobile router, and a mobile router flag specifying that the binding update was generated by a mobile router;

means for selectively establishing a bidirectional tunnel between the mobile router and the router, by entering the binding update request in a binding cache entry indicating the home address is reached by the care-of address, based on the router verifying that the home address is reachable via the care-of address, wherein the bidirectional tunnel is terminated by the mobile router and the router;

means for updating a routing table to specify that at least one identified address prefix served by the mobile router is reachable via the home address, the router distinct from a home agent configured for providing reachability to the mobile router via a mobile router-home agent tunnel that is distinct from the bidirectional tunnel;

wherein the establishing means includes means for verifying that the home address is reachable via the care-of address based on:

first sending a first packet, having a first secure key, to the home address for the mobile router;

second sending a second packet, having a second secure key, to the care-of address for the mobile router; and verifying the home address is reachable via the care-of address based on detecting the first secure key and the second secure key within the binding update request.

17. The router of claim 16, further comprising means for sending a request to a route server resource for the at least one address prefix served by the mobile router in response to establishment of the bidirectional tunnel, the updating means updating the routing table in response to receiving a response from the route server resource that specifies the at least one identified address prefix served by the mobile router.

18. The router of claim 17, wherein the sending means is configured for requesting from the router server the at least one address prefix corresponding to an identified host served by the mobile router.

19. The router of claim 17, wherein the sending means is configured for requesting from the route server resource address prefixes for all hosts served by the mobile router, the routing means receiving from the route server resource multiple identified address prefixes served by the mobile router.

20. The router of claim 19, further comprising means for selectively outputting router advertisement messages specifying the identified address prefixes are reachable via the router.

21. The router of claim 16, further comprising means for routing a packet from the correspondent node to a destination host served by the mobile router by:

generating a routable packet by adding a routing prefix to the packet that specifies the home address;

detecting the home address corresponds to a mobile node based on the mobile router flag;

retrieving the corresponding care-of address for the home address from the binding cache entry; and outputting onto the bidirectional tunnel an encapsulated packet that includes the routable packet encapsulated by a routing header that specifies the care-of address.

22. The router of claim 16, wherein:

the receiving means is configured for receiving a second binding update request from the mobile router that specifies the home address, a second care-of address for the mobile router, and the mobile router flag;

the establishing means is configured for verifying that the home address is reachable by the second care-of address; and the establishing means is configured for selectively establishing a new bidirectional tunnel to the mobile router by entering the second binding update request in a second binding cache entry, and deleting the binding update request entered in the binding cache entry, indicating the home address is reached by the second care-of address, based on the verifying that the home address is reachable by the second care-of address.

23. The router of claim 16, further comprising means for selectively deleting the binding cache entry based on a determined absence of packets via the bidirectional tunnel for at least a prescribed inactivity threshold.

24. The router of claim 16, further comprising means for registering with a route server resource having a prescribed security association with the router, the registering including supplying an IP address for the router and at least an address prefix that enables the route server resource to associate a route to the correspondent node via the router, the route server resource enabling the mobile router to associate the route to the correspondent node via the router.

25. The router of claim 16, wherein the IP-based router is implemented as a second mobile router having a second corresponding home address and a second corresponding care-of address and configured for communications via a tunnel terminated by a corresponding second home agent, the selectively establishing means configured for:

sending a second binding update request to the mobile router specifying the second home address, the second care-of address, and the mobile router flag;

validating for the mobile router that the second home address is reachable via the second care-of address; and establishing the bidirectional tunnel, bypassing the second home agent, with the mobile router based on receiving an acknowledgment to the second binding update request from the mobile router.

26. A mobile router comprising:

an IP interface configured for sending a query, via a tunnel terminated by a home agent, to a route server resource having a prescribed security association with the home agent, the query requesting identification of a correspondent router for a correspondent node, the mobile router configured for sending packets output from a local node to the correspondent node via a wide area network, the means for sending including:

(1) means for receiving a reply, via the tunnel terminated by the home agent, that specifies the correspondent router and at least an address prefix for the correspondent node;

(2) means for generating and sending a binding update request addressed to the correspondent router via a unidirectional tunnel established between the mobile router and the correspondent router, the binding update request specifying a corresponding home address for the mobile router, a corresponding care-of address for the mobile router, and a mobile router flag specifying that the binding update request was generated by a router that is mobile;

(3) means for validating for the correspondent router that the home address is reachable via the care-of address; and means for establishing by the mobile router a bidirectional tunnel, between the mobile router and the correspondent router and distinct from the tunnel terminated by the home agent based on the mobile router receiving an acknowledgment to the binding update request from the correspondent router, the bidirectional tunnel terminated by the mobile router and the correspondent router;

wherein the receiving means is configured for:

receiving a first packet, having a first secure key, from the correspondent node via the tunnel terminated by the home agent receiving from the correspondent node a second packet, having a second secure key and a routing header specifying the care-of address; and sending a validation message to the correspondent node, via the unidirectional tunnel, that includes the first secure key and the second secure key.

27. The mobile router of claim 26, wherein the means for establishing a bidirectional tunnel is configured for establishing the unidirectional tunnel based on updating a routing table to specify at least that the address prefix, for the correspondent node, is reachable via the correspondent router.

28. The mobile router of claim 27, wherein the reply specifies a plurality of address prefixes reachable by the correspondent router, the means for establishing a bidirectional tunnel configured for specifying within the routing table that the address prefixes are reachable by the correspondent router.

29. The mobile router of claim 26, wherein the receiving means is configured for:

receiving via the bidirectional tunnel a packet having a routing header specifying the care-of address;

removing the routing header to obtain a transmitted packet specifying the home address as a destination address;

recovering from the transmitted packet a destination packet specifying a host destination address within a range of an address prefix served by the mobile router; and outputting the destination packet to the local node having the host destination address.

30. The mobile router of claim 26, further comprising:

means for attaching to a new attachment router having a corresponding new care-of address;

the means for sending a binding update request configured for sending a second binding update request to the correspondent router based on attaching to the new attachment router, the second binding update request specifying the home address, the new care-of address, and a mobile router flag specifying that the second binding update request was generated by a router that is mobile;

the validating means configured for validating for the correspondent router that the home address is reachable via the second care-of address; and the bidirectional tunnel establishing means configured for establishing a new bidirectional tunnel with the correspondent router based on receiving an acknowledgment to the second binding update request from the correspondent router.

31. An Internet Protocol (IP) based router comprising:
a binding cache;
a routing table;
an IP interface; and
a mobility resource configured for receiving via the IP interface a binding update request generated by a mobile router, the router configured for sending packets output from a correspondent node to the mobile router via a wide area network, the binding update request addressed to the router and specifying a home address for the mobile router, a care-of address for the mobile router, and a mobile router flag specifying that the binding update was generated by a mobile router; the mobility resource configured for selectively establishing by the router a bidirectional tunnel between the mobile router and the router, by entering the binding update request in a binding cache entry indicating the home address is reached by the care-of address, based on the router verifying that the home address is reachable via the care-of address, wherein the bidirectional tunnel is terminated by the mobile router and the router;
the router configured for updating the routing table to specify that at least one identified address prefix served by the mobile router is reachable via the home address, the router distinct from a home agent configured for providing reachability to the mobile router via a mobile router-home agent tunnel that is distinct from the bidirectional tunnel;
wherein the mobility resource is configured for verifying that the home address is reachable via the care-of address by:
first sending a first packet, having a first secure key, to the home address for the mobile router;
second sending a second packet, having a second secure key, to the care-of address for the mobile router; and
verifying the home address is reachable via the care-of address based on detecting the first secure key and the second secure key within the binding update request.

32. The router of claim 31, wherein the mobility resource is configured for sending a request to a route server resource for the at least one address prefix served by the mobile router in response to establishment of the bidirectional tunnel, the router configured for updating the routing table in response to the mobility resource receiving a response from the route server resource that specifies the at least one identified address prefix served by the mobile router.

33. The router of claim 32, wherein the mobility resource is configured for requesting from the router server the at least one address prefix corresponding to an identified host served by the mobile router.

34. The router of claim 32, wherein the mobility resource is configured for requesting from the route server resource address prefixes for all hosts served by the mobile router, the mobility resource receiving from the route server resource multiple identified address prefixes served by the mobile router.

35. The router of claim 34, wherein the router is configured for selectively outputting router advertisement messages specifying the identified address prefixes are reachable via the router.

36. The router of claim 31, wherein the router is configured for routing a packet from the correspondent node to a destination host served by the mobile router by:
generating a routable packet by adding a routing prefix to the packet that specifies the home address;
detecting the home address corresponds to a mobile node based on the mobile router flag;
retrieving the corresponding care-of address for the home address from the binding cache entry; and
outputting onto the bidirectional tunnel an encapsulated packet that includes the routable packet encapsulated by a routing header that specifies the care-of address.

37. The router of claim 31, wherein:
the mobility resource is configured for receiving a second binding update request from the mobile router that specifies the home address, a second care-of address for the mobile router, and the mobile router flag, and verifying that the home address is reachable by the second care-of address;
the router configured for selectively establishing a new bidirectional tunnel to the mobile router by entering the second binding update request in a second binding cache entry, and deleting the binding update request entered in the binding cache entry, indicating the home address is reached by the second care-of address, based on the mobility resource verifying that the home address is reachable by the second care-of address.

38. The router of claim 31, wherein the router is configured for selectively deleting the binding cache entry based on a determined absence of packets via the bidirectional tunnel for at least a prescribed inactivity threshold.

39. The router of claim 31, wherein the router is configured for registering with a route server resource having a prescribed security association with the router, the registering including supplying an IP address for the router and at least an address prefix that enables the route server resource to associate a route to the correspondent node via the router, the route server resource enabling the mobile router to associate the route to the correspondent node via the router.

40. The router of claim 31, wherein the IP-based router is implemented as a second mobile router having a second corresponding home address and a second corresponding care-of address and configured for communications via a tunnel terminated by a corresponding second home agent, the mobility resource configured for:
sending a second binding update request to the mobile router specifying the second home address, the second care-of address, and the mobile router flag;
validating for the mobile router that the second home address is reachable via the second care-of address; and
establishing the bidirectional tunnel, bypassing the second home agent, with the mobile router based on receiving an acknowledgment to the second binding update request from the mobile router.

41. A mobile router comprising:
an IP interface;
a mobile resource configured for sending a query, via a tunnel terminated by the IP interface and a home agent, to a route server resource having a prescribed security association with the home agent, the query requesting identification of a correspondent router for a correspondent node, the mobile router configured for sending packets output from a local node to the correspondent node via a wide area network;
receiving a reply, via the tunnel terminated by the home agent, that specifies the correspondent router and at least an address prefix for the correspondent node;
generating and sending a binding update request addressed to the correspondent router via a unidirectional tunnel established between the mobile router and the correspondent router, the binding update request specifying a corresponding home address for the mobile router, a corresponding care-of address for the mobile router, and a mobile router flag specifying that the binding update request was generated by a router that is mobile;

validating for the correspondent router that the home address is reachable via the care-of address;

the mobile router configured for establishing by the mobile router a bidirectional tunnel, between the mobile router and the correspondent router and distinct from the tunnel terminated by the home agent based on the mobile router receiving an acknowledgment to the binding update request from the correspondent router, the bidirectional tunnel terminated by the mobile router and the correspondent router;

wherein the mobility resource further is configured for:

receiving a first packet, having a first secure key, from the correspondent node via the tunnel terminated by the home agent;

receiving from the correspondent node a second packet, having a second secure key and a routing header specifying the care-of address; and sending a validation message to the correspondent node, via the unidirectional tunnel, that includes the first secure key and the second secure key.

42. The mobile router of claim 41, further comprising a routing table, the mobile router configured for establishing the unidirectional tunnel based on the mobility resource updating the routing table to specify at least that the address prefix, for the correspondent node, is reachable via the correspondent router.

43. The mobile router of claim 42, wherein the reply specifies a plurality of address prefixes reachable by the correspondent router, the mobility resource configured for specifying within the routing table that the address prefixes are reachable by the correspondent router.

44. The mobile router of claim 41, wherein the mobility resource further is configured for:

receiving via the bidirectional tunnel a packet having a routing header specifying the care-of address;

removing the routing header to obtain a transmitted packet specifying the home address as a destination address;

recovering from the transmitted packet a destination packet specifying a host destination address within a range of an address prefix served by the mobile router; and outputting the destination packet to the local node having the host destination address.

45. The mobile router of claim 41, wherein:

the mobility resource is configured for attaching to a new attachment router having a corresponding new care-of address;

the mobility resource is configured for sending a second binding update request to the correspondent router based on attaching to the new attachment router, the second binding update request specifying the home address, the new care-of address, and a mobile router flag specifying that the second binding update request was generated by a router that is mobile;

the mobility resource is configured for validating for the correspondent router that the home address is reachable via the second care-of address; and the mobile router is configured for establishing a new bidirectional tunnel with the correspondent router based on receiving an acknowledgment to the second binding update request from the correspondent router.

* * * * *

UNITED STATES PATENT AND TRADEMARK OFFICE
CERTIFICATE OF CORRECTION

PATENT NO. : 7,552,234 B2
APPLICATION NO. : 10/361512
DATED : June 23, 2009
INVENTOR(S) : Thubert et al.

It is certified that error appears in the above-identified patent and that said Letters Patent is hereby corrected as shown below:

Column 11, line 32, insert --request-- after "update";

Column 14, line 19, insert --request-- after "update";

Column 14, line 21, insert --,-- after the word "tunnel";

Column 15, line 61, delete "means for sending" and insert --IP interface-- therefor;

Column 16, line 10, delete "by the mobile router";

Column 16, line 20, insert --;-- after the word "agent";

Column 17, line 5, insert --,-- after the word "receiving";

Column 17, line 6, insert --,-- after the word "interface";

Column 17, line 13, insert --request-- after "update";

Column 17, line 14, delete "by the";

Column 17, line 15, delete the first instance of "router" and insert --,-- after the word "tunnel";

Column 17, line 17, insert --in the binding cache-- after the word "entry";

Column 17, line 18, delete "router" and insert --mobility resource-- therefor;

Column 18, line 49, insert --and-- after the ";";

Column 18, line 50, delete "mobile" and insert --mobility-- therefor;

UNITED STATES PATENT AND TRADEMARK OFFICE
CERTIFICATE OF CORRECTION

PATENT NO. : 7,552,234 B2
APPLICATION NO. : 10/361512
DATED : June 23, 2009
INVENTOR(S) : Thubert et al.

It is certified that error appears in the above-identified patent and that said Letters Patent is hereby corrected as shown below:

Column 18, line 57, insert --, the mobility resource further configured for:-- after the word "network" and delete the ";";

Column 19, line 5, delete "by the mobile";

Column 19, line 6, delete the first instance of "router"; and

Column 19, line 8, insert --,-- after the word "agent".

Signed and Sealed this

Twenty-seventh Day of October, 2009

David J. Kappos
*Director of the United States Patent and Trademark Office*